Jan. 14, 1958   F. M. VICTOR   2,819,667
PORTABLE BRAZIER
Filed Oct. 26, 1956
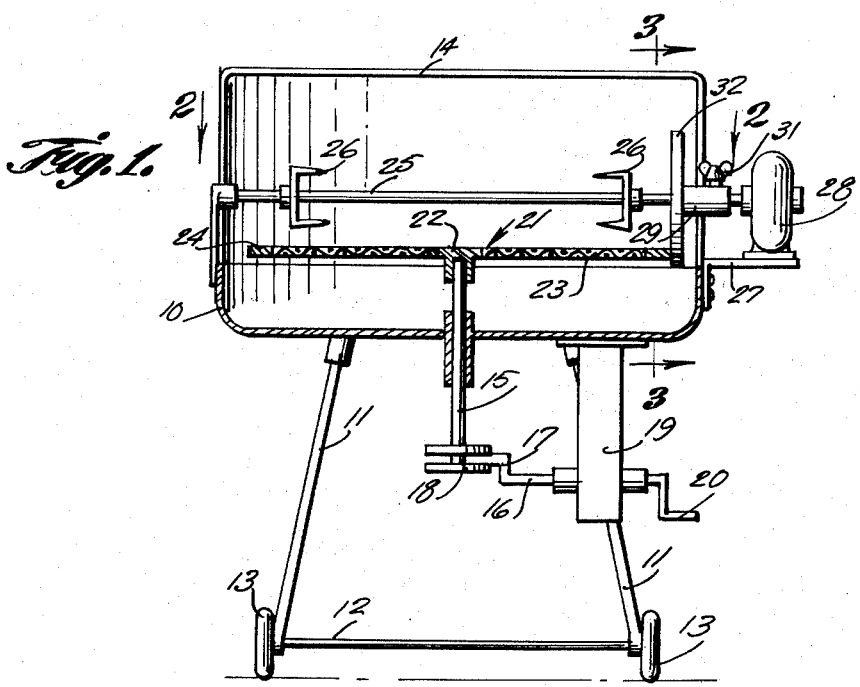
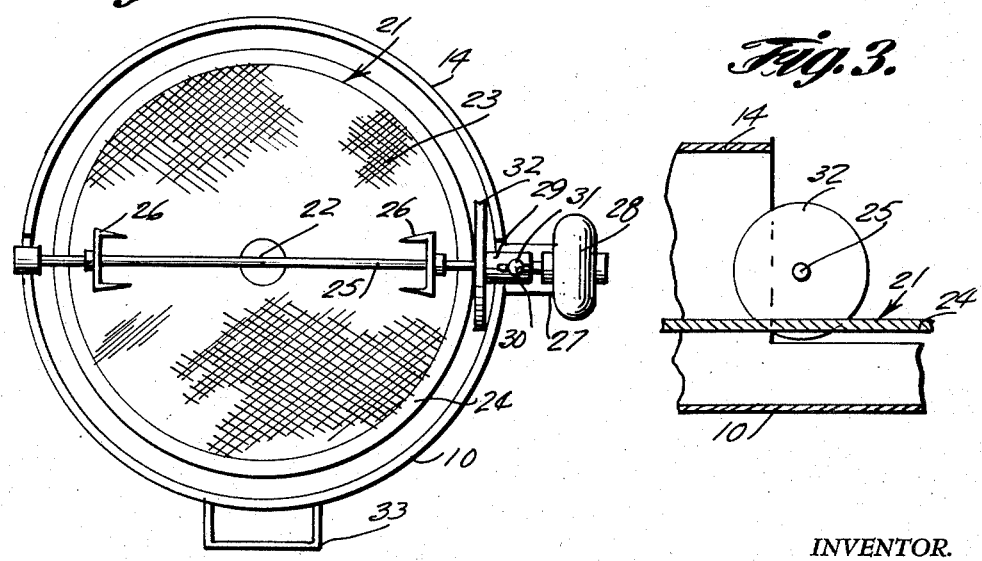
INVENTOR.
Frank M. Victor
BY Victor J. Evans & Co.
ATTORNEYS United States Patent Office 2,819,667
Patented Jan. 14, 1958

2,819,667
PORTABLE BRAZIER
Frank M. Victor, Redondo Beach, Calif.
Application October 26, 1956, Serial No. 618,485
3 Claims. (Cl. 99—339)

This invention relates to a cooking apparatus, and more particularly to a portable brazier.

The object of the invention is to provide a portable brazier which includes a grill that is automatically rotated so that foodstuff on the grill will be properly cooked or barbecued without being burned.

Another object of the invention is to provide a portable brazier which includes a bowl that has a rotary grill arranged therein, the grill being automatically rotated by means of a wheel which is driven by a suitable motor or the like, whereby foodstuff which may be supported on the grill will be evenly cooked without the necessity of having to turn the foodstuff by hand.

A further object of the invention is to provide a portable brazier which is extremely simple and inexpensive to manufacture.

Other objects and advantages will be apparent during the course of the following description.

In the accompanying drawings, forming a part of this application, and in which like numerals are used to designate like parts throughout the same.

Figure 1 is a side elevational view of the portable brazier constructed according to the present invention, and with parts broken away and in section.

Figure 2 is a sectional view taken on the line 2—2 of Figure 1.

Figure 3 is a sectional view taken on the line 3—3 of Figure 1.

Referring in detail to the drawings, the numeral 10 indicates a bowl which can be made of any suitable material, and there is further provided a plurality of legs 11 for supporting the bowl 10, the legs 11 having an axle 12 connected thereto, and whereby wheels 13 may be mounted on the ends of the axle 12, Figure 1. There is further provided a hood or cover 14 for the portable brazier.

Extending upwardly through the central portion of the bowl 10 is a vertically adjustable rod 15, and there is provided a manually operable means for raising and lowering the rod 15. This means comprises a crank 16 which includes an offset portion 17 which is arranged in engagement with a bushing or connecting piece 18 on the lower end of the rod 15. A crank 16 is journaled in a body member 19 which depends from the lower end of the bowl 10. The crank 16 is provided with a handle 20.

There is further provided a grill which is indicated generally by the numeral 21, and the grill 21 includes a central collar 22 which is connected to the upper end of the rod 15. The grill 21 further includes a major body portion 23 which can be made of any suitable material such as screen wire, and the grill 21 further includes an annular ring 24 for a purpose to be later described.

Arranged above the grill 21 is a rotary shaft 25 which has gripping elements or prongs 26 mounted thereon.

Extending outwardly from one side of the bowl 10 is a bracket 27 which supports a motor 28, and the motor 28 may be of conventional construction and may be connected to a suitable source of electrical energy by means of wires. The motor 28 serves to rotate the shaft 25.

Mounted on the shaft 25 is a sleeve 29 which is provided with a slot 30, Figure 2, and a suitable securing element such as a set screw 31 extends through the slot 30 and into engagement with the shaft 25 for maintaining the sleeve 29 immobile in its adjusted positions on the shaft 25. Formed integral with the sleeve 29 or secured thereto is a wheel 32, and the wheel 32 is arranged in frictional engagement with the outer periphery of the ring 24 of the grill 21 so that as the motor 28 is actuated, the shaft 25 will rotate to thereby turn the wheel 32 which in turn will rotate the grill 21. Thus, any foodstuff such as hamburgers or the like which are supported on the screen 23 of the grill 21, will be evenly and properly roasted or cooked by the heat passing up from the hot charcoals which are arranged below the grill 21 and within the bowl 10.

Due to the provision of the crank 16 which can be rotated by means of the handle 20, the rod 15 can be raised or lowered to thereby raise or lower the grill 21 so that it will contact different portions of the wheel 32 and this arrangement provides a means for varying the speed of rotation of the grill 21 since the speed of rotation of the grill will vary as the relative position between the grill and wheel 32 is adjusted or shifted.

A handle member 33 may be connected to the bowl 10 for use in facilitating the movement of the portable brazier from place to place as desired.

From the foregoing it is apparent that there has been provided a portable brazier which is especially suitable for use in cooking or barbecuing foods outdoors. In use, the foodstuff to be cooked or barbecued may be arranged on the shaft 25 and engaged by the gripping members or prongs 26. Then, when the motor 28 is actuated, the shaft 25 will be rotated so that the foodstuff will be rotated whereby the foodstuff will be cooked evenly on all sides as the result of the heat which passes up from the charcoal bowl 10. As an alternative method of using the apparatus, foodstuff such as hamburgers, sausage or the like may be placed directly on the grill 21 so that these foodstuffs are supported by the screen portion 23 of the grill 21. Then, when the motor 28 is actuated, the shaft 25 will rotate and this will rotate the wheel 32. As the wheel 32 rotates, it turns the grill 21 since the wheel 32 is arranged in frictional engagement with the outer periphery of the ring 24 of the grill 21. This rotation of the grill 21 with the foodstuff thereon will insure that the foodstuff will be evenly and properly cooked and whereby the foodstuff will be moved efficiently around the bowl without the necessity of moving the grill or foodstuff thereon by hand.

The present invention includes several adjustments, as for example, the grill 21 can be raised or lowered as desired by turning the crank 16 by means of the handle 20. This movement of the crank 16 causes the rod 15 to move up and down since the offset portion 17 of the crank 16 engages the bushing 18 on the lower ends of the rod 15. Since the grill 21 can thereby be raised or lowered, the ring 24 can be moved towards or away from the center of the wheel 32 so that the speed of rotation of the grill 21 can be regulated or controlled as desired. Furthermore, by loosening the screw or bolt 31, the sleeve 29 and wheel 32 can be adjusted on the shaft 25 so that the wheel 32 can be moved to different positions on the shaft. With the present invention foodstuff can be readily cooked or barbecued so that the chances of foodstuff being overcooked or burned will be minimized since the material being heated or cooked is automatically moved or turned.

The wheel 32 turns the grill 21 at a constant speed, and the wheel 32 runs along the edge of the grill. The crank 16 is used for raising or lowering the grill. With the present invention the grill is automatically rotated so that the person using the grill does not have to pay constant attention to the cooking of the food. The bolt 31 serves to lock the sleeve 29 and wheel 32 in place on the shaft 25 and by loosening the bolt 31, the wheel 32 can be adjusted on the shaft or completely removed therefrom. The wheel 32 is provided with a central opening through which extends the shaft 25 and when the wheel is on the shaft, the food can be rotated on the shaft 25 and also food can be rotated on the grill 21. The wheel 32 can be made of asbestos or any other material which is not affected by heat. The grill 21 can be raised or lowered even when the wheel 32 is in position, and the grill 21 will turn slowly. Thus, food on the grill 21 will be evenly heated and it is not necessary to turn the food by hand

I claim:

1. In a portable brazier, a bowl, a plurality of legs for supporting said bowl, wheels connected to certain of said legs, a body member depending from said bowl, a crank journaled in said body member, a vertically adjustable rod extending up through said bowl, a bushing on the lower end of said rod connected to said crank, an adjustable grill arranged within said bowl and including a central collar connected to the upper end of said rod, said grill further including an outer annular ring, a shaft supported above said grill, a sleeve adjustably mounted on said shaft and provided with a slot, a securing element extending through said slot and into engagement with said shaft, a wheel connected to said sleeve and arranged in engagement with the outer periphery of the ring of said grill, prongs on said shaft, and means for rotating said shaft.

2. In a portable brazier, a bowl, a plurality of legs for supporting said bowl, wheels connected to certain of said legs, a body member depending from said bowl, a crank journaled in said body member, a vertically adjustable rod extending up through said bowl, a bushing on the lower end of said rod connected to said crank, an adjustable grill arranged within said bowl and including a central collar connected to the upper end of said rod, said grill further including an outer annular ring, a shaft supported above said grill, a sleeve adjustably mounted on said shaft and provided with a slot, a securing element extending through said slot and into engagement with said shaft, a wheel connected to said sleeve and arranged in engagement with the outer periphery of the ring of said grill, prongs on said shaft, and means for rotating said shaft, said means comprising a motor.

3. In a portable brazier, a bowl, a plurality of legs for supporting said bowl, a body member depending from said bowl, a crank journalled in said body member, an adjustable rod extending up through said bowl, a bushing on said rod connected to said crank, an adjustable grill arranged within said bowl and including a collar connected to said rod, said grill including a ring, a shaft supported above said grill, a sleeve adjustably mounted on said shaft and provided with a slot, a securing element extending through said slot and into engagement with said shaft, a wheel connected to said sleeve and arranged in engagement with said grill, prongs on said shaft, and means for rotating said shaft.

References Cited in the file of this patent

UNITED STATES PATENTS

| 1,552,854 | James | Sept. 8, 1925 |
| 2,740,395 | Goodwin | Apr. 3, 1956 |

FOREIGN PATENTS

| 12,690 | Great Britain | May 22, 1897 |